Sept. 4, 1928.
L. H. SHIPMAN
SOLAR HEATING APPARATUS
Filed Aug. 5, 1925
1,683,266
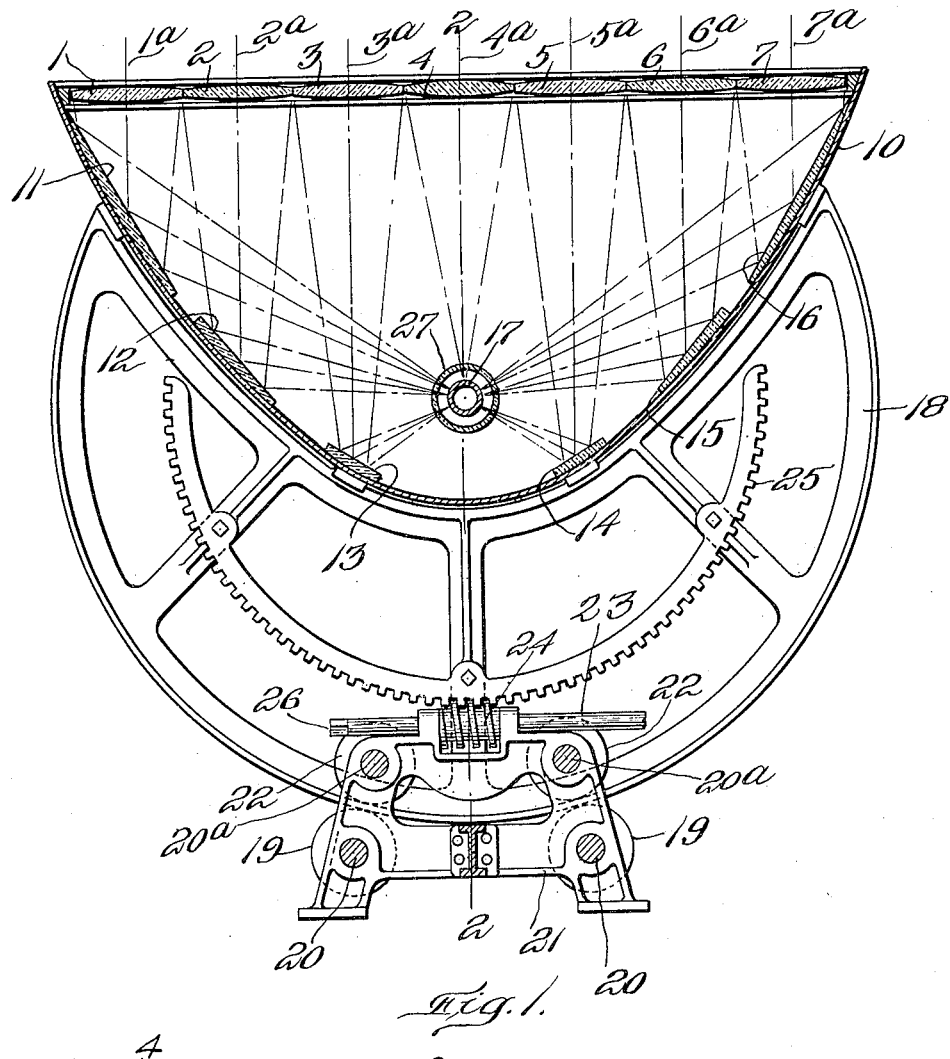

Patented Sept. 4, 1928.

1,683,266

UNITED STATES PATENT OFFICE.

LEWIS H. SHIPMAN, OF BOSTON, MASSACHUSETTS.

SOLAR HEATING APPARATUS.

Application filed August 5, 1925. Serial No. 48,323.

My invention relates to solar heating apparatus and it has for its object to provide an apparatus of this kind which will be of simple and efficient construction.

To these ends I have provided a solar heating apparatus having the peculiar features of construction and mode of operation set forth in the following description, the novel features of the invention being particularly pointed out and defined in the claims at the close thereof.

In the accompanying drawings:

Figure 1 is a transverse vertical sectional view of a solar heating apparatus constructed in accordance with my invention.

Figure 2 is a section on line 2—2 of Figure 1.

My improved solar heating apparatus comprises a plurality of focusing lenses 1 to 7 inclusive, preferably arranged in one plane, with their axes parallel. These lenses are in the form of bars as shown in Figure 2, and are supported at their ends in channels 8, 8 provided upon the inner faces of two members 9, 9. These two members 9 are the end walls of a trough-shaped frame 10, which for convenience may be made of the parabolic shape, in cross section, as shown in Figure 1, said end wall members 9 being disposed within the trough frame 10 and secured to the latter in any suitable manner.

Within the frame 10 are also fixedly mounted a number of reflectors 11, 12, 13, 14, 15 and 16, one for each lens except the centrally disposed lens 4. Each reflector is in the form of a strip or bar extending from end to end of the trough-shaped frame 10, and may be made of any suitable material or materials.

Extending through the trough-shaped frame 10 is a metal pipe 17, and this pipe besides extending loosely through holes in the end walls 9, is positioned with its axis coincident with the focal line of the parabolic frame 10. It will thus be seen that the reflectors 11—16 are disposed in a group focused upon the pipe 17, and that the beams of light from all of the lenses except the middle lens 4 are, owing to this arrangement, all of the same length or substantially the same length as measured from the lenses to the mirrors and thence to the pipe. In Figure 1 the lines 1ª, 2ª, 3ª, 4ª, etc., indicate the median planes of the lenses, and the distance from each of the lenses, except the middle lenses 4, to its reflector, plus the distance from the line of incidence of this median line with its reflector to the pipe 17 being, in the case of each of the six lenses, the same.

It will be clear from the description given above that with the group of lenses disposed perpendicularly to solar rays, those rays passing through each lens will be condensed and directed upon the reflectors, and thence directed, still converging to a focal line at the pipe 17. The middle lens 4 is constructed so as to focus directly upon the pipe 17. It will thus be clear that if each lens collects and delivers upon the pipe a given amount of heat, the total heat delivered to the pipe 17 will be, with the number of lenses shown, seven times that delivered by one lens.

The apparatus which I have designed is intended, for example, for household or domestic use, and would be placed in a position where it would be exposed to the sun's rays with the axis of the pipe 17 extending north and south.

In order that the group of lenses may be maintained perpendicularly to the sun's rays, provision is herein made for adjustment of the trough frame 10 together with the mirrors and lenses on the axis of the pipe 17 to follow the movement of the sun during the day. To provide for this, the trough frame 10 has secured to each end thereof an arcuate leg 18, whose curve is concentric with the axis of pipe 17, and these legs rest upon two pairs of rollers 19, 19, fixed to the ends of shafts 20 journaled in bearings on a frame 21. The peripheral portion of each leg 18 is made with a flange 18ª resting on the wheels 19 and said flange is held against tilting on the wheels 19 by two pairs of rollers 22 disposed immediately above the flanges 18ª. The frame 21 rotatably supports a shaft 23 carrying a worm 24 engaging a segmental worm gear 25, the latter being bolted rigidly to one of the arcuate legs 18. As the sun travels across the firmament during the day the shaft 23 and worm 24 are rotated in timed relation therewith and act through the segmental gear 25 to swing the legs 18, frame 10 and parts carried by the latter on the axis of pipe 17 so as to maintain the plane of the lenses perpendicular to the sun's rays. This rotation of the shaft 23 may be effected automatically by suitable orientating means, or the same may be effected manually by means of a socket crank applied to the squared end 26 of the shaft 23. As will be clear, the worm 24 through its engagement with the segmental gear 25 serves to lock the rotatable or adjustable parts against the effect of gravity or accidental displacement.

In connection with the pipe 17 I have shown a transparent glass jacket 27 having an interior diameter greater than the outside diameter of the pipe 17, so as to provide a dead air space 28, which is closed at its ends by collars 29 by which the glass tube 27 is separated from the pipe 17. It will be clear that the air contained within the tube 27 will become highly heated and its heat will be transmitted to the pipe 17.

The above described apparatus is of simple and efficient construction, and while I have shown the apparatus as utilizing the collected energy from the sun to heat a pipe 17 and the air within the tubular jacket 27, yet it will be clear that other devices located at the focal line or regions may be substituted therefor. The construction described, however, is useful for heating air or water contained within the pipe 17, and the steam or heated air may be utilized for various purposes, being continuously supplied by my apparatus, it being understood that one end of the pipe 17 would be connected with a supply of air or water, and the opposite end of the pipe 17 would deliver the steam or heated air to transforming or storage apparatus.

What I claim is:

1. In an apparatus for utilizing solar heat the combination of a parabolic reflecting structure comprising a plurality of flat longitudinally extending reflectors disposed parallel with the focal axis of said structure; a plurality of longitudinally extending lens bars disposed parallel with the focal axis of said structure and supported in position at the front of said structure so as to concentrate the rays on to said reflectors, and a conduit whose axis is coincident with the focal axis of said reflecting structure.

2. An apparatus for utilizing solar heat constructed in accordance with claim 1 and wherein is provided a tubular member surrounding said conduit within said structure and providing an inclosed air space between said tubular member and said conduit, said tubular member being transparent.

LEWIS H. SHIPMAN.